United States Patent
Lo

(10) Patent No.: US 7,434,001 B2
(45) Date of Patent: Oct. 7, 2008

(54) METHOD OF ACCESSING CACHE MEMORY FOR PARALLEL PROCESSING PROCESSORS

(76) Inventor: Shi-Wu Lo, 5F-5, 168 San-Hsing, Ming-Hsiung, Chia-Yi (TW)

( * ) Notice: Subject to any disclaimer, the term of this patent is extended or adjusted under 35 U.S.C. 154(b) by 237 days.

(21) Appl. No.: 11/508,253

(22) Filed: Aug. 23, 2006

(65) Prior Publication Data
US 2008/0052465 A1    Feb. 28, 2008

(51) Int. Cl.
*G06F 12/00* (2006.01)
(52) U.S. Cl. .................. 711/120; 711/129; 711/130
(58) Field of Classification Search ............. 711/120, 711/129, 130
See application file for complete search history.

(56) References Cited
U.S. PATENT DOCUMENTS

2004/0215883 A1* 10/2004 Bamford et al. ............ 711/129
2006/0004963 A1* 1/2006 Mattina et al. .............. 711/130
2006/0112228 A1* 5/2006 Shen .......................... 711/133
2007/0143546 A1* 6/2007 Narad ......................... 711/130

* cited by examiner

*Primary Examiner*—Hiep T Nguyen
(74) *Attorney, Agent, or Firm*—Rosenberg, Klein & Lee

(57) ABSTRACT

A method of accessing cache memory for parallel processing processors includes providing a processor and a lower level memory unit. The processor utilizes multiple instruction processing members and multiple sub-cache memories corresponding to the instruction processing members. Next step is using a first instruction processing member to access a first sub-cache memory. The first instruction processing member will access the rest sub-cache memories when the first instruction processing member does not access the desired data successfully in the first instruction processing member. The first instruction processing member will access the lower level memory unit until the desired data have been accessed, when the first instruction processing member does not access the desired data successfully in the sub-memories. Then, the instruction processing member returns a result.

14 Claims, 2 Drawing Sheets

METHOD OF ACCESSING CACHE MEMORY FOR PARALLEL PROCESSING PROCESSORS

BACKGROUND

1. Field of Invention

The present invention relates to a method of accessing cache memory. More particularly, the present invention relates to a method of accessing cache memory for parallel processing.

2. Description of Related Art

In the recent years, operating speed of processors has been rapidly increased because of unceasing improvements of semiconductor process technique. However, cache memory access has not been greatly speeded-up. The speed difference between processors and cache memories has become larger and larger.

Generally, the speed difference between processors and cache memories needs to be solved. For example, modern processors utilize hierarchical memory design to solve such problem.

The hierarchical memory design introduces data locality including two locality types identified as temporal locality and spatial locality to increase the speed of cache memory access, resulting in better processors performance. That is because cache memory is a type of dynamic allocation memory allocated by hardware, and program instruction execution time is highly related to cache hit rate.

For simultaneous multithreading (SMT) and chip-multi processor (CMP) processors, the execution time of one program will be influenced by another program that is simultaneously executed. Although using cache partition method could eliminate the reciprocal effect of parallel processing programs in single physical processor, this method does not allow the use of common cache, so the usage rate of the cache cannot be efficiently increased.

The abovementioned problem can be overcome by dynamically adjusting the size of a sub-cache memory of each mini-processor. However, dynamic adjustment of the sub-cache size is generally achieved by modifying replacement algorithm. Unfortunately, changing the size of a cache partition will be time consuming when only a few cache miss occurs, which results in the so-called latency. For programs that perform a quality of service (QoS) or a timing constraint task, the latency reduces the quality of service or causes deadline miss. System performance will not be improved in such circumstances.

Therefore, the locality brings three major influences.

First, the worst case execution time (WCET) will be difficult to predict because of the cache hit rate. In process design, the WCET influences seriously the prediction of operating time of the entire system. Therefore, how to correctly predict the cache hit rate becomes the biggest challenge for predicting WCET. Besides, the prediction of WCET is a fundamental work for designing embedded systems or real-time systems. If WCET is difficult to predict, software designs for those systems will be influenced.

Second, a phenomenon, so-called trashing, may happen between those parallel processing programs executed at the instruction level. The thrashing phenomenon happens when lots of cache miss occur in level one (L1) cache memory inside the processor, i.e., the cache hit rate is low. The low cache hit rate rapidly lowers the number of instructions that a processor is able to execute per second. When the working sets of different parallel processing programs refer to the same cache line of the cache memory, different programs will overwrite other's working set where thrashing occurs, resulting in lowering system performance.

Third, the difficulty in designing the scheduler of operation system has been increased. The CMP processor and the SMT processor contain simple processors or logical processors, collectively called mini-processor. Generally, the operating system supposes each mini-processor will fairly use hardware resources and will not influence with each other. If the usage of cache memory is not limited, a program executes with a memory intensive program or a CPU intensive program in parallel processing will generate different results, which increases the difficulty in designing the operating system.

Therefore, there is a need to provide an improved method of accessing cache to mitigate or obviate the aforementioned problems.

SUMMARY

An object of the present invention is to provide a method of accessing cache memory for parallel processing to efficiently increase cache utilization.

Another object of the present invention is to provide a method of accessing cache memory for parallel processing to precisely predict the worse case execution time, WCET.

A method in accordance with the present invention includes providing a processor and a lower level memory unit. The processor has multiple instruction processing members and a higher level memory unit. The higher level memory unit may be a level one (L1) cache memory having multiple sub-cache memories that are respectively corresponding to the instruction processing members.

The next step is using a first instruction processing member to access a first corresponding sub-cache memory for a block of desired data.

When the first instruction processing member is not able to access the desired data in the first sub-cache memory, the next step is using the first instruction processing member to access other sub-cache memories until the desired data is accessed in a second sub-cache memory. The next step is accessing the lower level memory until the desired data is accessed when the desired data is not able to be accessed in all the sub-cache memories.

The next step is loading the desired data accessed from the lower level memory unit to one of the sub-cache memories according to a pre-determined order when cache miss happens. The pre-determined order comprises three sequences.

First, the accessed desired data is loaded in a dead cache line in the first sub-cache memory, where the dead cache line is a cache line that is declared to be not reused prior to any future reference or that will not be referenced.

Second, the accessed desired data is loaded in a dead cache line in one of the sub-cache memories other than the first sub-cache memory.

Third, the accessed desired data is loaded in a given reference in the first sub-cache memory according to a pre-determined rule. The pre-determined rule can use First In First Out (FIFO) method, random method or Least Recently Used, LRU method etc.

The present invention has some advantages.

First, the worst case execution time (WCET) can be predicted by restricting each instruction processing member to have first priority to access the corresponding sub-cache memory.

Second, the present invention dose not need to dynamically partition the level one cache memory, which avoids additional latency and shares efficiently the level one cache memory to reduce response time of the instruction processing member.

Third, the present invention renders the most recently used (MRU) data for the instruction processing member to be stored in the corresponding sub-cache memory to enhance cache hit rate.

Last, the present invention eliminates the cache thrashing phenomenon.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
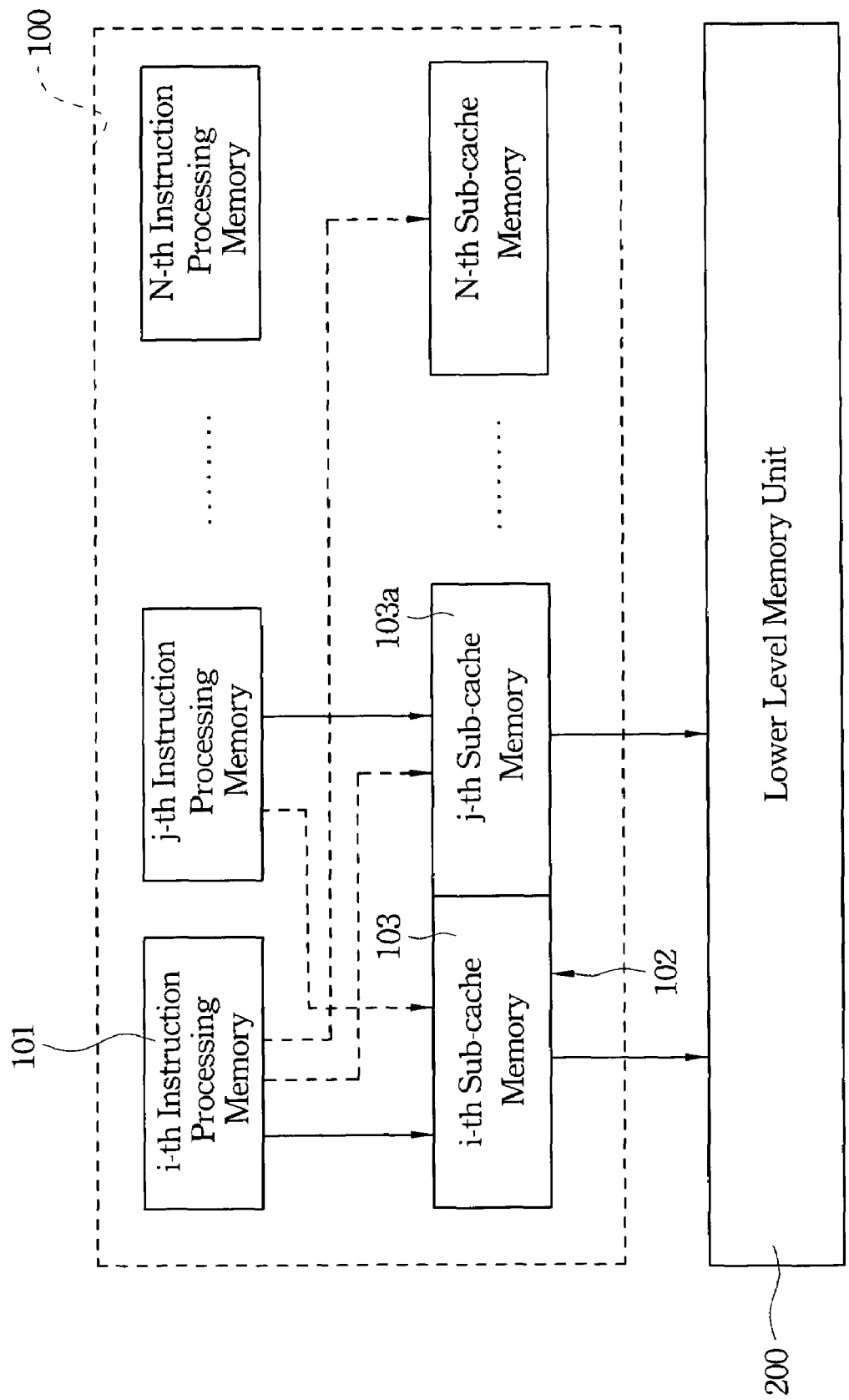
FIG. 1 is a schematic system diagram in accordance with the present invention.

Reference will now be made in detail to the present preferred embodiments of the invention, examples of which are illustrated in the accompanying drawings. Wherever possible, the same reference numbers are used in the drawings and the description to refer to the same or like parts.

With reference to FIG. 1, which illustrates schematic system diagram in accordance with the present invention. The method in accordance with the present invention includes providing a processor 100 and a lower level memory unit 200. The processor 100 may be a simultaneous multi-threading (SMT) processor or a chip-multiprocessor (CMP), and has multiple instruction processing members 101 and a higher level memory unit such as a level one (L1) cache memory 102. The instruction processing members 101 may be mini processors that constitute the core of the processor 100. Further, the instruction processing members 101 may be simple processors, logical processors or instruction execution programs.

The lower level memory unit 200 is relative to the higher level memory unit. For example, if the higher level memory unit is the level one cache memory 102, then the lower level memory unit 200 may be a level two (L2) cache memory, a level three (L3) cache memory etc. or the main memory.

The level one cache memory 102 has multiple sub-cache memories 103 that may be formed by cache partition. Each instruction processing member 101 has a corresponding sub-cache memory 103. For example, an i-th instruction processing member 101 has an i-th corresponding sub-cache memory 103 and has the first priority to access the i-th sub-cache memory 103.

Figure 2:
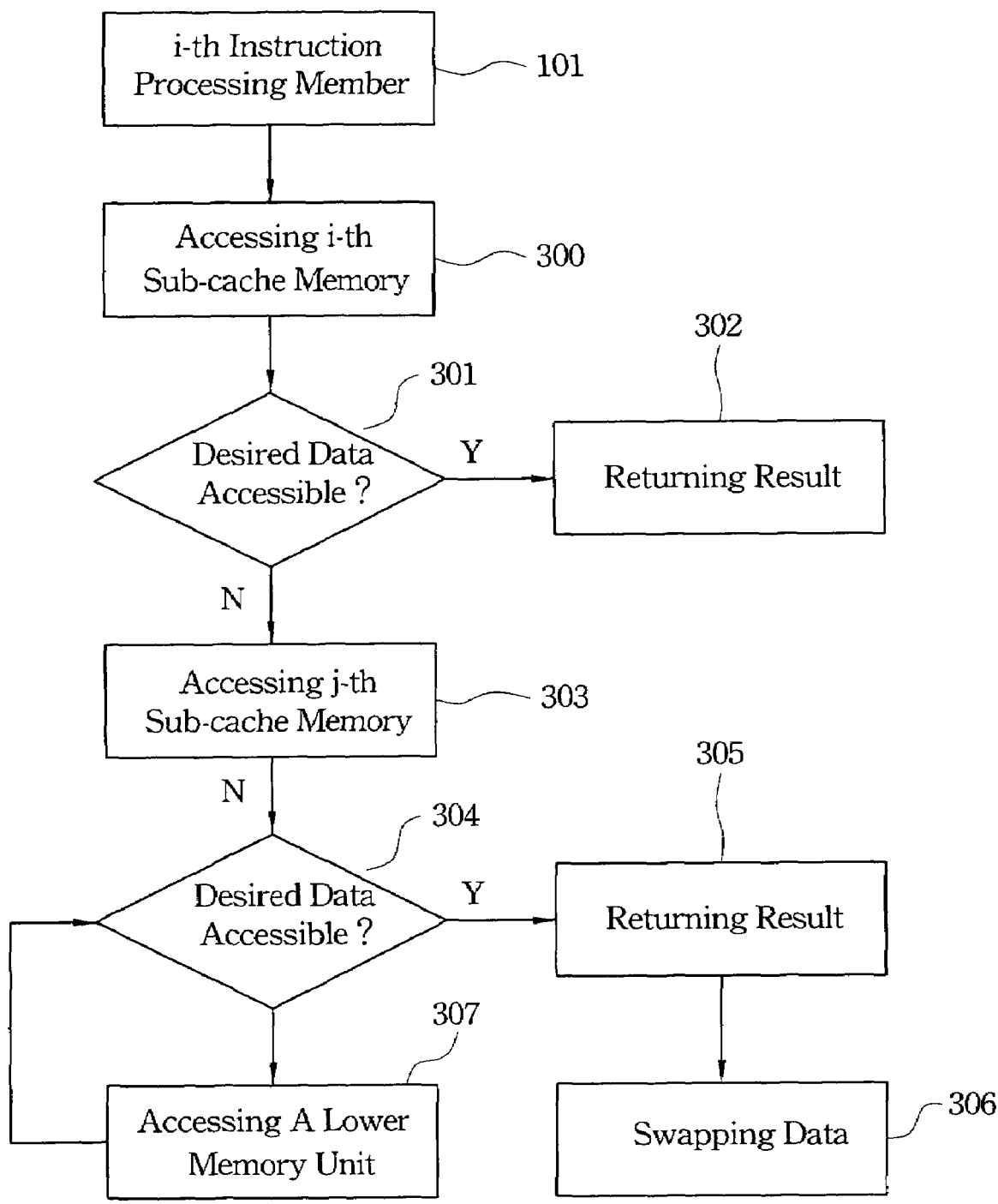
FIG. 2 is a flow chart of a method in accordance with the present invention.

With further reference to FIG. 2, which illustrates a flow diagram in accordance with the present invention. This preferred embodiment uses two instruction processing members 102 for illustrative purposes only, the present invention can be extended to multiple instruction processing members 102. When using an i-th instruction processing member 101 to access a corresponding i-th sub-cache memory 103 as shown in step 300, the next step is to determine whether a block of desired data is accessible in the corresponding i-th sub-cache memory 103 as shown in step 301. When the desired data is accessible in the corresponding i-th sub-cache memory 103, it returns a result as shown in step 302.

When the desired data cannot be accessed in the corresponding i-th sub-cache memory 103, the next step is to access a j-th sub-cache memory 103a as shown in step 303. The next step is to determine whether the desired data is accessible in the j-th sub-cache memory 103a at step 304.

When the i-th instruction processing member 101 has accessed the desired data in the j-th sub-cache memory 103a, it returns a result as shown in step 305. The index letter "i" is not equal to "j", which means the i-th instruction processing member 101 will continuously access the other sub-cache memory until the desired data has accessed in a j-th sub-cache memory 103a.

If the desired data cannot be accessible in the j-th sub-cache memory 103a, which means the i-th instruction processing member 101 cannot access the data in all the sub-cache memories 103. At this circumstance, the cache miss happens. The i-th instruction processing member 101 will access the lower level memory unit 200 until the desired data have been accessed at step 307.

When the desired data has been accessed in the lower level memory unit 200, the method could use a swap step to load the accessed desired data to the level one cache memory 102 as shown in step 306. Thus, the first hit rate of the cache memory for the entire system has been increased. The efficiency of accessing the level one cache memory 102 has been improved.

When the cache miss happens, the desired data accessed from the lower level memory unit 200 is loaded to one of the sub-cache memories according to a pre-determined order. The pre-determined order comprises three sequences.

First, the accessed desired data is loaded in a dead cache line in the i-th sub-cache memory 103, where the dead cache line is a cache line declared to be not reused prior to any future reference or that will not be referenced. Method of determining and declaring a cache line to a dead state has been developed and discussed in many publications and recognized by a skilled person in this art. It is not the feature of the present invention. Therefore, related description is not provided.

Second, the accessed desired data is loaded in a dead cache line in one of the sub-cache memories 103a other than the i-th sub-cache memory 103.

Third, the accessed desired data is loaded in a given reference in the i-th sub-cache memory 103 according to a pre-determined rule. The pre-determined rule can use First In First Out (FIFO) method, random method or Least Recently Used, LRU method etc.

Therefore, the most recently used (MRU) data of each instruction processing member 101 will be stored in the corresponding sub-cache memory 103 after the operations of swap step. The first cache hit rate is increased.

Consequently, to predict the WCET is accomplished by restricting each instruction processing member 101 to have first priority to access corresponding sub-cache memories 103. In practical application, the system may have simultaneously real-time and non-real time application programs, which generates more slack time. The additional slack time will help improve quality of service (QoS) or allow the CPU entering power saving mode.

The present invention has some advantages.

First, the WCET can be predicted by restricting each instruction processing member 101 to have first priority to access the corresponding sub-cache memories 103.

Second, the present invention dose not need to dynamically partition the level one cache memory 102, which avoids additional latency and shares efficiently the level one cache memory 102 to reduce response time of the instruction processing member 102.

Third, the present invention renders the MRU data for the instruction processing member 101 to be stored in the corresponding sub-cache memory 103 to enhance cache hit rate.

Last, the present invention eliminates the cache thrashing phenomenon.

The above descriptions of the embodiments and examples of the present invention are illustrative. Although the above descriptions takes the level one cache memory for the higher level memory unit for example, the applications of the present invention are not limited in the level one cache memory. The method in accordance with the present invention may be adopted and used in other memory components such as level two cache memory, level three cache memory etc. and translation look-aside buffer (TLB) to achieve the effects and advantages provided and produced by the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of accessing cache for parallel processors, and the method comprising:
    (a) providing a processor and a lower level memory unit, wherein the processor has multiple instruction processing members and a higher lever memory unit with multiple sub-cache memories corresponding respectively to the instruction processing members;
    (b) using a first instruction processing member to access a first sub-cache memory corresponding to the first instruction processing member for a block of desire data;
    (c) accessing one of the sub-cache memories other than the first sub-cache memories until the desired data is accessed in a second sub-cache memory when the desired data is not accessible in the first sub-cache memory; and
    (d) accessing the lower level memory until the desired data is accessed when the desired data is not accessible in the sub-cache memories;
    (e) loading the desired data accessed from the lower level memory unit to one of the sub-cache memories according to a pre-determined order when a cache miss happens, and the pre-determined order comprising
        first, loading the accessed desired data in a dead cache line in the first sub-cache memory;
        second, loading the accessed desired data in a dead cache line in one of the sub-cache memories other than the first sub-cache memory; and
        third, loading the accessed desired data in a given reference in the first sub-cache memory according to a pre-determined rule.

2. The method as claimed in claim 1, wherein the pre-determined rule uses a First In First Out (FIFO) method.

3. The method as claimed in claim 1, wherein the pre-determined rule uses a random method.

4. The method as claimed in claim 1, wherein the pre-determined rule uses a Least Recently Used (LRU) method.

5. The method as claimed in claim 1, wherein each of the instruction processing member is a mini processor.

6. The method as claimed in claim 1, wherein the higher level memory unit is a level one cache, and each of the sub-cache memories is formed by a partition of the level one cache.

7. The method as claimed in claim 1, wherein each of the instruction processing member is a simultaneous multi-threading processor or chip-multiprocessor.

8. The method as claimed in claim 1, wherein each of the instruction processing member is a sample processor.

9. The method as claimed in claim 1, wherein each of the instruction processing member is a logical processor.

10. The method as claimed in claim 1, wherein each of the instruction processing member uses an instruction program.

11. The method as claimed in claim 1, wherein the higher level memory unit is a level one cache memory.

12. The method as claimed in claim 1, wherein the higher level memory unit is a level two cache memory.

13. The method as claimed in claim 1, wherein the higher level memory unit is a level three cache memory.

14. The method as claimed in claim 1, wherein the higher level memory unit is a translation look-aside buffer (TLB).

* * * * *